(12) United States Patent
Scoca et al.

(10) Patent No.: US 7,920,821 B2
(45) Date of Patent: Apr. 5, 2011

(54) ALL SHIP SPEEDS CORRELATION SONAR SIMULATOR

(75) Inventors: Anthony L. Scoca, Hicksville, NY (US); Jerry G. Klein, New York, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 2193 days.

(21) Appl. No.: 10/372,239

(22) Filed: Feb. 25, 2003

(65) Prior Publication Data
US 2004/0166478 A1   Aug. 26, 2004

(51) Int. Cl.
*G09B 9/00* (2006.01)
(52) U.S. Cl. .................................. 434/6; 703/5
(58) Field of Classification Search .................. 367/1–2, 367/7, 12, 13, 90, 91, 100, 124, 131, 135, 367/136; 434/365, 118, 218, 2–10; 342/169–170; 73/865.6; 701/200; 703/2–5, 6, 18, 19, 24; 715/772; 376/217, 237, 245, 254, 267, 2, 376/6, 18
See application file for complete search history.

(56) References Cited

U.S. PATENT DOCUMENTS

| | | | | |
|---|---|---|---|---|
| 3,610,798 A | * | 10/1971 | Murphree | 434/6 |
| 3,916,533 A | * | 11/1975 | Kijesky | 434/9 |
| 3,936,954 A | * | 2/1976 | Anderson et al. | 434/6 |
| 3,936,958 A | * | 2/1976 | Clapsaddle | 434/7 |
| 4,198,703 A | * | 4/1980 | Huisveld et al. | 367/1 |
| 4,244,026 A | * | 1/1981 | Dickey, Jr. | 702/143 |
| 4,306,301 A | * | 12/1981 | Geren et al. | 367/1 |
| 4,398,274 A | * | 8/1983 | Chotiros | 367/90 |
| 4,495,809 A | * | 1/1985 | Higginbotham et al. | 73/865.6 |
| 4,667,199 A | * | 5/1987 | Roberts | 342/169 |
| 4,847,817 A | * | 7/1989 | Au et al. | 367/135 |
| 4,908,800 A | * | 3/1990 | DiLemmo | 367/13 |
| 4,914,639 A | * | 4/1990 | Lind et al. | 367/91 |
| 4,954,996 A | * | 9/1990 | Fazzolari et al. | 367/13 |
| 4,972,379 A | * | 11/1990 | Harris, Jr. | 367/13 |
| 4,991,143 A | * | 2/1991 | Foss et al. | 367/1 |
| 5,122,989 A | * | 6/1992 | Pirie et al. | 367/2 |
| 5,155,706 A | * | 10/1992 | Haley et al. | 367/7 |
| 5,317,542 A | * | 5/1994 | Konopelski | 367/12 |
| 5,363,305 A | * | 11/1994 | Cox et al. | 701/200 |
| 5,381,383 A | * | 1/1995 | Burfeindt | 367/13 |
| 5,481,503 A | * | 1/1996 | Kuhn et al. | 367/100 |
| 5,654,938 A | * | 8/1997 | Tang | 367/34 |

(Continued)

FOREIGN PATENT DOCUMENTS

JP         06102345 A   *   4/1994

(Continued)

*Primary Examiner* — Xuan M Thai
*Assistant Examiner* — Timothy Musselman
(74) *Attorney, Agent, or Firm* — Schwegman, Lundberg & Woessner, P.A.

(57) ABSTRACT

The present invention is a system that mathematically simulates acoustic waves that are reflected off an ocean floor from a SONAR transducer mounted on a ship, submarine, or other water navigable craft. By varying the number of mathematical equations, the form of the equations, and the parameters of the equations, many different conditions may be simulated in the laboratory before testing and implementing a SONAR system at sea. The system can simulate either a spatial hydrophone SONAR system or a temporal hydrophone SONAR system for all ship speeds (i.e. all velocity components). The novel equations used in the system are based on the physics of correlation SONAR, and are applied in real time simulation environments to provide for accurate SONAR simulation of a ship's velocity.

11 Claims, 6 Drawing Sheets

Spatial Array

U.S. PATENT DOCUMENTS

| | | | |
|---|---|---|---|
| 5,828,625 A * | 10/1998 | Costa | 367/13 |
| 5,841,735 A * | 11/1998 | Quazi | 367/124 |
| 5,949,738 A * | 9/1999 | Murphree | 367/1 |
| 5,978,646 A * | 11/1999 | Weinberg | 434/6 |
| 6,096,085 A * | 8/2000 | Sammelman | 703/2 |
| 6,384,771 B1 * | 5/2002 | Montague et al. | 342/170 |
| 6,393,449 B1 * | 5/2002 | Bair et al. | 708/270 |
| 6,396,518 B1 * | 5/2002 | Dow et al. | 715/772 |
| 6,411,566 B1 * | 6/2002 | Katz et al. | 367/135 |
| 6,525,990 B2 * | 2/2003 | Deveau | 367/13 |
| 6,584,300 B2 * | 6/2003 | Lengua | 434/6 |
| 6,683,820 B1 * | 1/2004 | Struzinski | 367/131 |
| 6,778,469 B1 * | 8/2004 | McDonald | 367/136 |
| 6,813,220 B2 * | 11/2004 | Hicks et al. | 367/136 |
| 6,934,218 B1 * | 8/2005 | Chen | 367/2 |
| 2004/0166478 A1 * | 8/2004 | Scoca et al. | 434/6 |

FOREIGN PATENT DOCUMENTS

JP    10282221 A  * 10/1998

* cited by examiner

Figure 2
Temporal Array
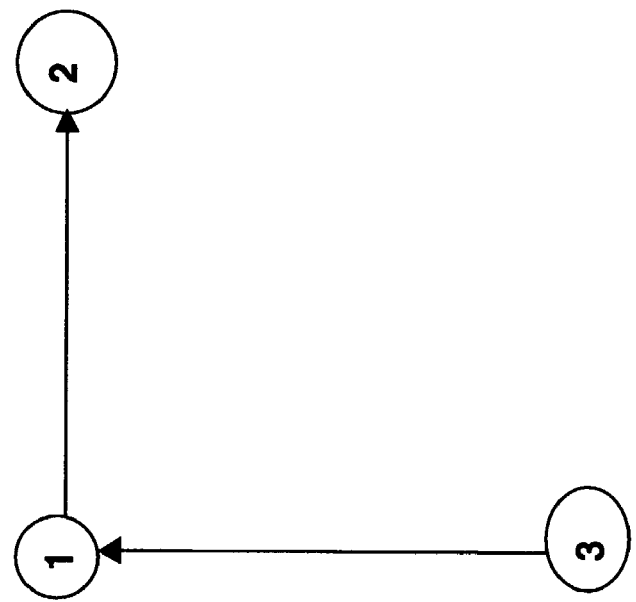
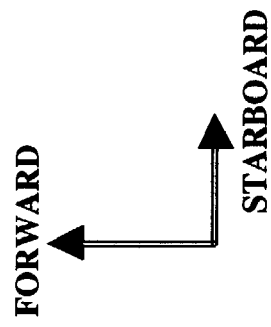

ALL SHIP SPEEDS CORRELATION SONAR SIMULATOR

FIELD OF THE INVENTION

The present invention relates to SONAR systems for water navigable craft, and in particular, computer simulation of input waves for such systems.

BACKGROUND

Ships, submarines, and other water navigable craft are equipped with highly complex Navigation SONAR Systems (NSS) that interface with the craft's central navigation system through a central navigation computer. These systems employ detailed software and/or firmware and extensive hardware on which such software and/or firmware executes. Such systems measure a ship's velocity. When measuring velocity, SONAR transducers located on the hull of a ship transmit pulses to the ocean bottom. These pulses reflect off the ocean bottom, return to the ship, and are sensed by hydrophones located on the ship's hull. The hydrophones may be in a spatial arrangement, in which there are usually sixteen hydrophones arranged around the perimeter of a square, or in a temporal fashion, one arrangement of which consists of three hydrophones placed at three corners of a square.

When determining velocity, two or more pulses are transmitted to the ocean bottom, reflected off the ocean bottom, received back at the hydrophone array, and correlated amongst the multiple hydrophones to determine which two hydrophones best match the two pulses of interest. The velocity of a ship can then be calculated by dividing the distance between the two correlated hydrophones by twice the time differential between the receipt of the two distinct pulses by the two hydrophones.

Since testing of an NSS at sea is costly and time consuming, a system that simulates the input for an NSS would be very useful to manufacturers and users of SONAR systems, particularly a system which could simulate all ship speeds.

SUMMARY OF THE INVENTION

The present invention is a system which mathematically simulates acoustic waves that are reflected off the ocean floor from a SONAR transducer mounted on a ship, submarine, or other water navigable craft. By varying the number of mathematical equations, the form of the equations, and the parameters of the equations, many different conditions may be simulated in the laboratory before testing and implementing a SONAR system at sea. The system can simulate either a spatial hydrophone SONAR system or a temporal hydrophone SONAR system for all ship speeds (i.e. all velocity components). The novel equations used in the system are based on the physics of correlation SONAR, and are applied in real time simulation environments to provide for accurate SONAR simulation of a ship's velocity.

In the system of the present invention, the output of each hydrophone of the SONAR system is represented by a mathematical equation. For example, a spatial hydrophone array of sixteen hydrophones would be represented by sixteen different equations. Each equation has two sinusoidal terms (cosine) therein—one to represent an acoustic wave originating from the starboard side of the hydrophone array, and another to represent an acoustic wave originating from a position that is forward of the hydrophone array. All cosine terms in these equations consist of the trigonometric operand involving frequency and time (i.e., $2\pi ft$), and a phase shift that is calculated from the distance that a ship has moved in either the forward or starboard direction. Additionally, some of the equations, depending upon the position of the particular hydrophone in the array with which the equation is associated, have an additional phase parameter factored in that accounts for the difference in time that each hydrophone senses a particular reflected wave based on the position of the hydrophone in the array.

The equations are continuous, representing an echo resulting from a hypothetical transmit. Appropriate gating is applied to create the required short individual pulses used for correlation. Each set of equations after gating represents the receipt of a particular pulse by all of the hydrophones at a particular time. By simulating the time between pulses and/or the distance between hydrophones, the system calculates all ship speeds. In particular, the system simulates return waveforms for a certain ship speed and these waveforms in analog form can be used as inputs into a SONAR for testing purposes.

Consequently, it is an object of the present invention to implement a system that simulates acoustic waves received by a water navigable craft.

It is another object of the present invention to use such a system to produce input for a Navigation SONAR System (NSS).

It is a further object of the present invention to calculate all ship speeds under many simulated conditions by simply changing the values of parameters in mathematical equations.

It is still another object of the present invention to produce simulated waveforms for any and/or all ship speeds, and to use these waveforms as input into navigation systems (NSS) for testing purposes.

BRIEF DESCRIPTION OF THE DRAWINGS

FIG. 2 is a diagram of a temporal hydrophone array.

DETAILED DESCRIPTION

A. SONAR Operation at Sea

The present invention simulates ocean bottom return waves that are used as input into a SONAR system. The system can simulate either a spatial array of hydrophones or a temporal array of hydrophones. The simulated input is used by a SONAR system to calculate any and/or all ship speeds.

Figure 3:
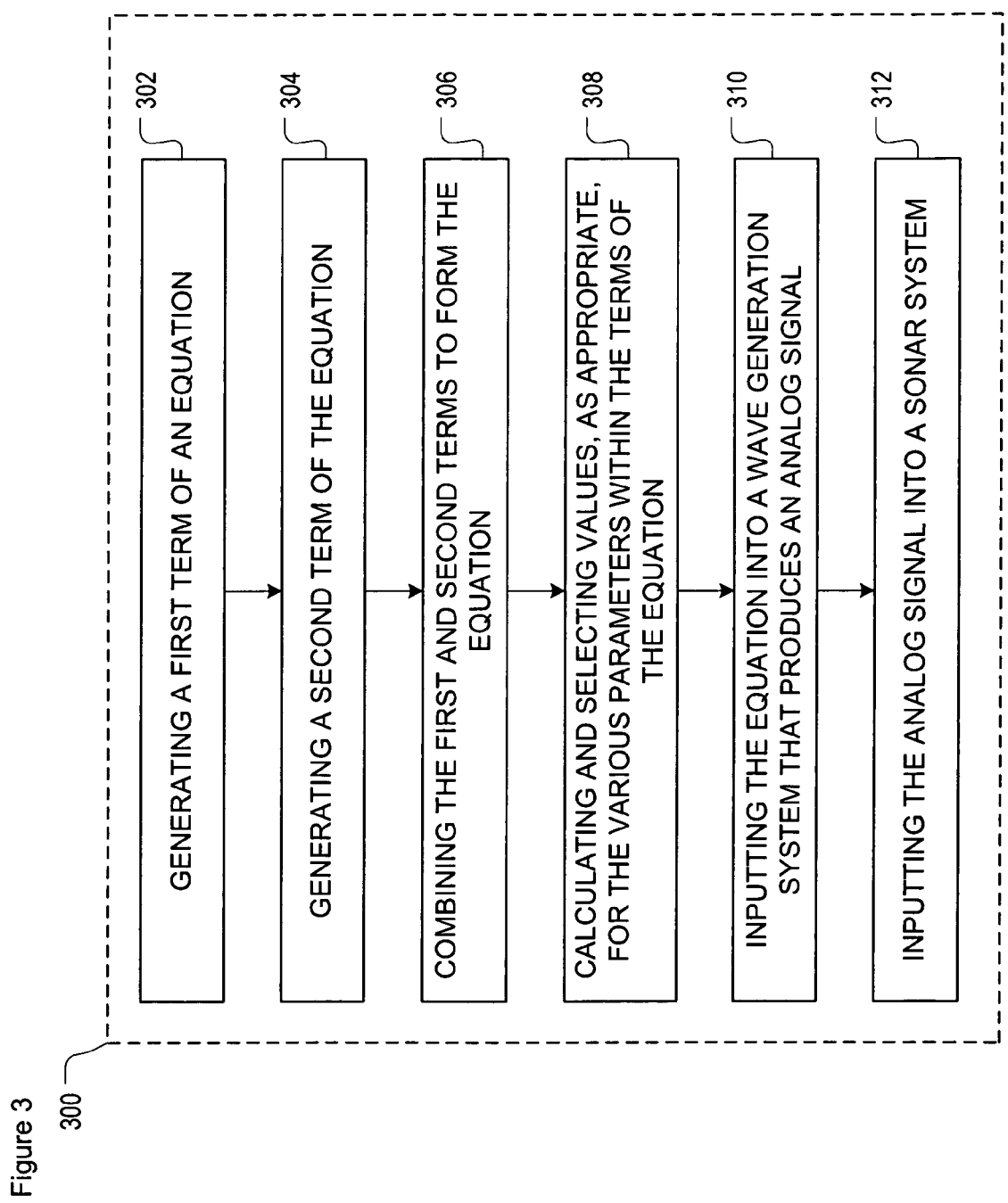
FIG. 3 depicts a flow diagram of a method in accordance with the illustrative embodiment of the present invention.

FIG. 3 depicts the salient tasks of method 300 for simulating the velocity of a ship in water. Tasks 302 through 312 are shown.

Task 302, "generating a first term of an equation," pertains to the development of a set of equations that apply to ship's movement to the side (e.g., starboard, etc.). The "first term" simulates a return wave that was originally transmitted from the side of the ship.

Task 304, "generating a second term of an equation," pertains to the development of a set of equations that simulate the movement of the ship in the forward direction. The "second term" simulates a return wave that was originally transmitted as a forward oriented beam.

Task 306, "combining the first and second terms to form the equation".

Task :308, "calculating and selecting values . . . for the various parameters within the terms of the equation".

Task 310, "inputting the equation into a wave generation system that produces an analog signal" and task 312, "inputting the analog signal into a SONAR system".

Figure 4:
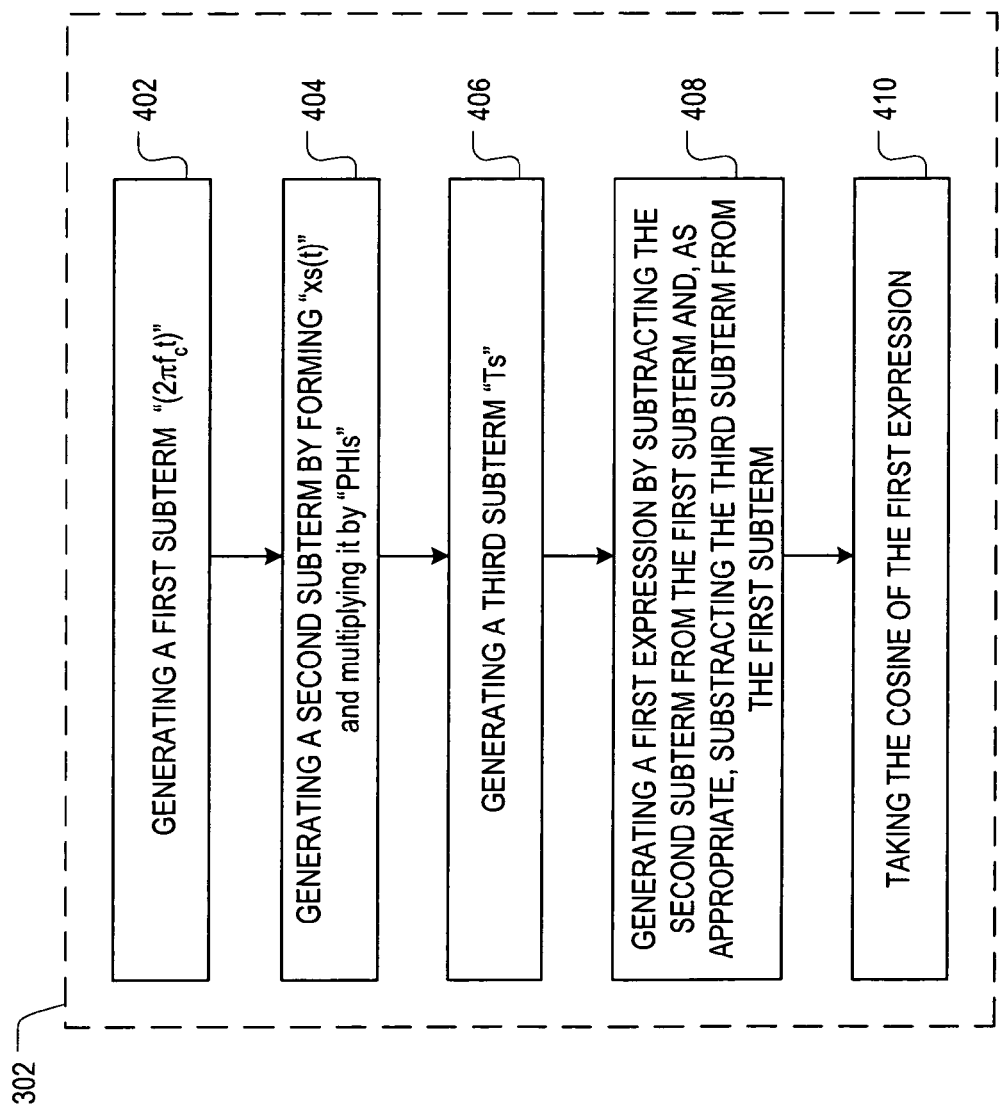
FIG. 4 depicts a flow diagram of the salient subtasks required for accomplishing a first task of the method of FIG. 3.

FIG. 4 depicts subtasks that are used to perform task 302 (generating a first term of an equation). They are identified in FIG. 4 as subtasks 402 through 410.

Subtask 402, "generating a first subterm '2~fct'".

Subtask 404, "generating a second subterm by forming 'xs(t)' and multiplying it by 'PHIs'".

Subtask 406, "generating a third subterm 'Ts'".

Subtask 408, "generating a first expression . . . ".

Subtask 410, "taking the cosine of the first expression".

Figure 5:
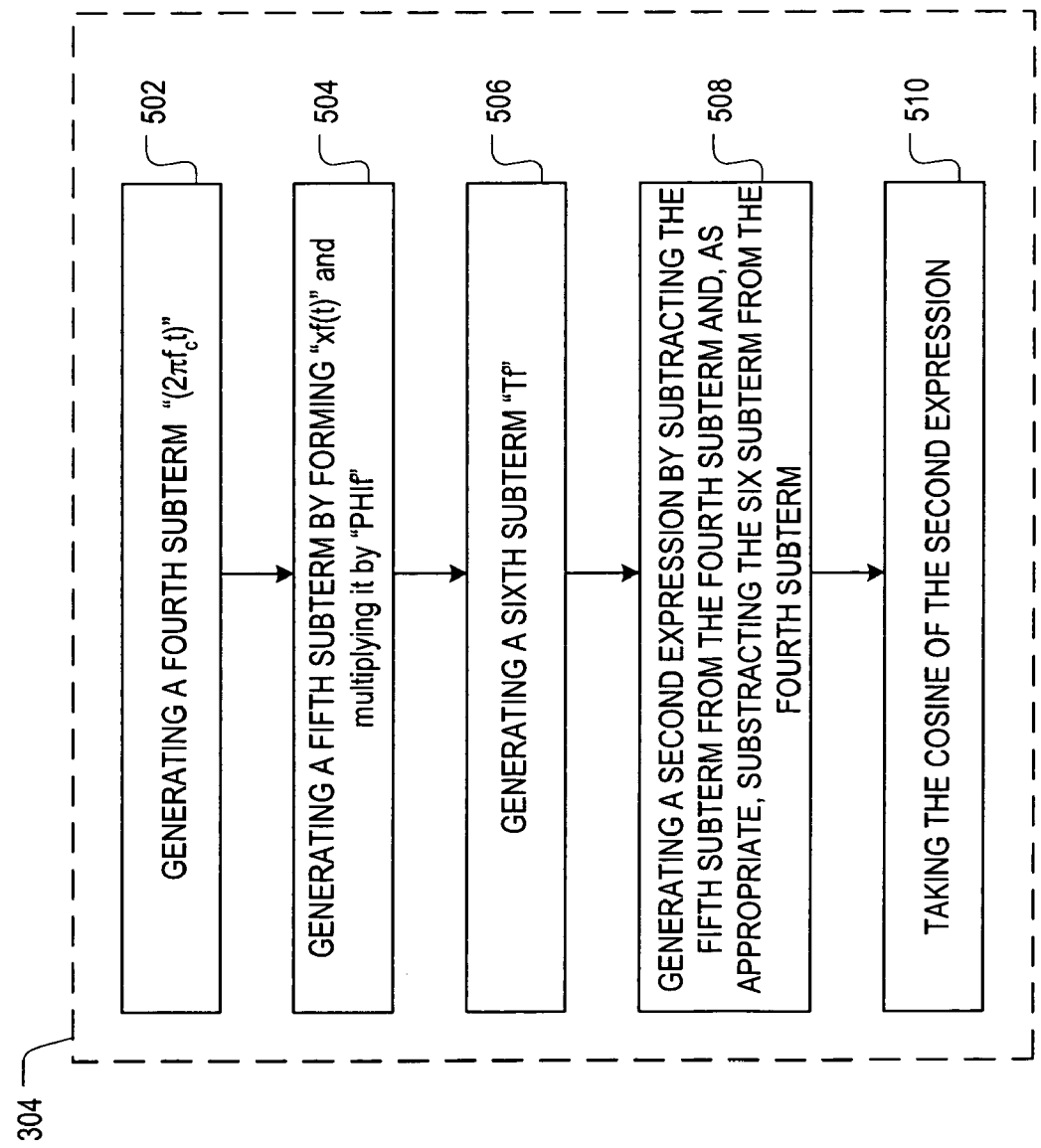
FIG. 5 depicts a flow diagram of the salient subtasks required for accomplishing a second task of the method of FIG. 3.

FIG. 5 depicts subtasks that are used to perform task 304 (generating a second term of an equation). They are identified in FIG. 5 as subtasks 502 through 510.

Subtask 502, "generating a fourth subterm '2~ct'" is described at paragraphs.

Subtask 504, "generating a fifth subterm by forming 'xf(t)' and multiplying it by 'PHII'".

Subtask 506, "generating a sixth subterm 'Tf'".

Subtask 508, "generating a second expression . . . ".

Subtask 510, "taking the cosine of the first expression" is described at paragraphs.

Figure 6:
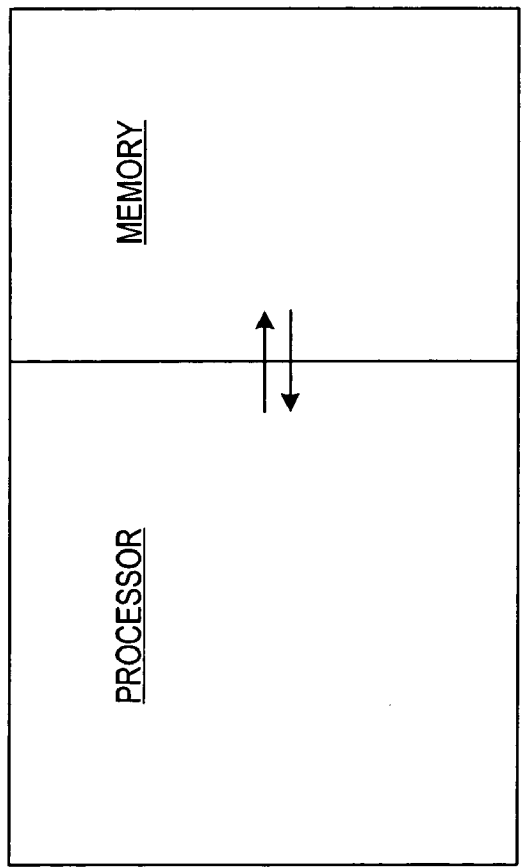
FIG. 6 depicts a block diagram of a processor and memory for use in conducting the method of FIG. 3.

FIG. 6 depicts a processor and memory for implementing method 300.

Figure 7:
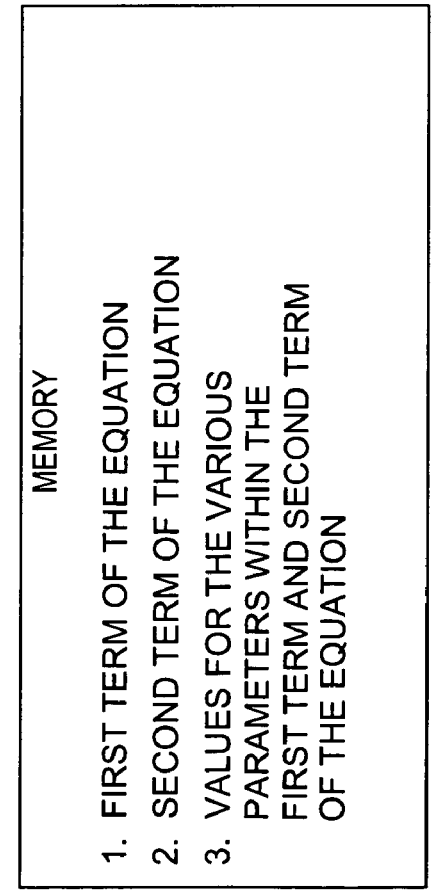
FIG. 7 depicts some of the contents of the memory of FIG. 6.

FIG. 7 depicts the contents of the memory of FIG. 6.

Figure 1:
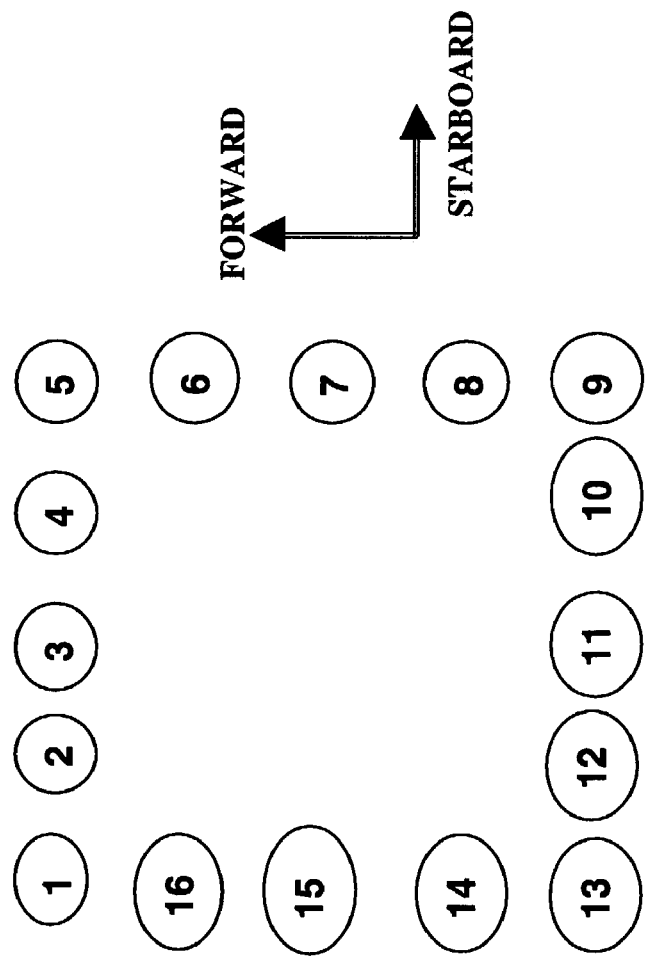
FIG. 1 is a diagram of a spatial hydrophone array.

By way of background, a spatial array of hydrophones is arranged on the hull of a ship in a square orientation as illustrated in FIG. 1. A transducer sends acoustic pulses from the ship perpendicularly down to the ocean bottom. The pulses reflect off the ocean floor, return back to the ship, and are sensed by the hydrophone two-dimensional array.

When an acoustic pulse is transmitted from a ship to the ocean floor, reflected off the ocean floor, and then received back at a hydrophone array, there is of course a time delay between transmission of the pulse and receipt of the pulse equaling the time it takes the pulse to travel to the ocean floor and back up to the ship again. During this time period, the ship is moving through the water. However, because of currents, wind, and other factors, the ship may not travel in a strictly forward direction. In fact, the ship will more likely than not travel to some extent towards starboard or port also. Therefore, a correlation SONAR system measures a ship's speed in both the forward and starboard or port directions.

In a correlation SONAR system, two or more pulses are transmitted to the ocean floor in sequential fashion resulting in a time differential between an earlier and a later pulse, with the earlier pulse returning to the ship and being sensed by a ship's hydrophone array before the later pulse is sensed. The reception of the initial pulse marks a baseline, and the reception of the later pulse marks a time equal to the baseline plus the time difference between the pulses (which is known because the time differential between the transmission of the pulses is known). In practice, when an acoustic wave is transmitted to the ocean floor, because of the physics of wave propagation and reflection, a broad wave is reflected off the ocean floor. Consequently, the reflected wave is not sensed by just a single hydrophone. Rather, the broad wave front (plane wave) washes across all the hydrophones. The two hydrophones in which the waveforms of the two received pulses correlate the best are deemed to be the hydrophones receiving the earlier and later pulses respectively and their spatial separation equals the total distance traveled by the ship between the transmit times and the receive times of the two pulses. Because the time differential between the reception of an earlier and a later pulse is known, and the distance separating the hydrophones is also known, the ship's speed (in the forward and/or starboard directions) is easily calculated by dividing the distance between the hydrophones that produce the best correlation between the first received pulse and the second received pulse by twice the time differential between the first and second pulses. For example, if the hydrophones that produce the best correlation are separated by ten meters, and the time differential between the first and second pulse is one second, then the ship's speed in that direction is five meters per second. It should be noted that normally the waves received on two different hydrophones do not always correlate perfectly. The distance used in the speed calculation is then taken at some point between the two hydrophones and is computed by an appropriate curve-fitting interpolation algorithm.

A temporal hydrophone array functions in a similar manner. In a temporal array, the speeds of a ship are calculated based on the calculated time differential between the receipt of a first pulse by a first hydrophone and the receipt of a second pulse by a second hydrophone, and the known distance between the two hydrophones that received the first and second pulses respectively. As shown in FIG. 2, a temporal array of hydrophones may consist of three hydrophones. Several pulses are transmitted down to the ocean floor, spaced at known and preferably equal time intervals. The waves are reflected off the ocean floor and received as plane wave fronts as previously explained in connection with spatial hydrophone arrays. These wave fronts from each reflected beam, as with a spatial array system, wash over the hydrophones in FIG. 2. To measure speed in the forward direction, the two hydrophones aligned in the forward direction are used. Similarly, to measure speed in the starboard direction, the two hydrophones aligned in the starboard direction are used. The SONAR system then determines by a peak correlation process which two waves (pulses) received by the hydrophones correlate the best. When the waves (pulses) are properly correlated, the time period separating the two identified waves can be determined, and it is then a simple matter to calculate the ship's speed in each of the forward or starboard directions by dividing the fixed distance between the hydrophones in the forward or starboard directions by twice the time differential between the initial pulse and the later pulse identified by the best correlation and interpolation.

B. The Novel SONAR Simulation System

The present invention uses mathematical equations with sinusoidal parameters to simulate acoustic waves that are reflected off the ocean floor. These equations and the parameters in these equations can be altered to simulate the speed and direction of a ship (including backwards). In this manner, any speed (i.e. velocity) of a ship can be simulated by the present invention.

In practice, an actual SONAR system transmits a fairly wide beam to the ocean floor in order to obtain the required velocity accuracy, and the echo off the ocean bottom contains scatterings off a growing ring of insonification. It would be overly complicated and processing intensive to implement a simulator based on simulation of such actual bottom returns.

Therefore, to simplify the simulation system, the transmission of a pencil beam is simulated at a non-normal angle off the Main Response Axis (MRA, i.e. the perpendicular path from the ship keel to the ocean bottom).

The simulation of a return wave transmitted from the starboard side of the ship will be first described. The simulated waveform is represented by the expression cosine ($2\pi f_c t$), where $f_c$ is the frequency of the transmitted wave. A sinusoidal wave is later received altered in phase in accordance with the movement of the ship in the starboard direction. As previously explained, correlation SONAR requires a correlation between an earlier pulse and a later pulse, i.e. the determination of which two hydrophones produce the best correlation between the earlier pulse and the later pulse, where the time between pulses can be determined and the distance between hydrophones is known. As also explained above, to measure a ship's velocity, or speed in both the forward and starboard directions, a two-dimensional hydrophone array is required. To simulate a two dimensional hydrophone array in the system, a second pencil beam pulse in a plane orthogonal to the first beam is simulated (by adding another cosine term to each equation).

To explain the simulation equations in detail, a single pencil beam in the starboard direction will now be considered. The system simulates the return of waveforms from the ocean bottom with separate equations for each virtual hydrophone. In an actual system, using a hydrophone array as illustrated in FIG. 1, a transmitted wave originates from the ship, and any movement of the ship in the starboard direction causes the hydrophone array leg 1-5 to move during the times of transmit and receive. In such a one dimensional transmission, hydrophone 5 will be the first to receive the reflected returning wave, followed by hydrophone 4, then hydrophones 3, 2 and 1. Therefore, equations to simulate a return wave in an actual SONAR system at sea as just described are represented as follows:

$$CH1(t) = \cos(2\pi f_c t - PHIs \cdot xs(t))$$

$$CH2(t) = \cos(2\pi f_c t - PHIs \cdot xs(t)) - Ts)$$

$$CH3(t) = \cos(2\pi f_c t - PHIs \cdot xs(t)) - 2Ts)$$

$$CH4(t) = \cos(2\pi f_c t - PHIs \cdot xs(t)) - 3Ts)$$

$$CH5(t) = \cos(2\pi f_c t - PHIs \cdot xs(t)) - 4Ts)$$

In the above equations, CH1(t) is the simulation equation for hydrophone 1 (for a wave received at time t), CH2(t) is the simulation equation for hydrophone 2, and so on. The original wave form transmitted by the system is represented by the cos ($2\pi f_c t$) term. The term xs(t) represents the total distance traveled by a ship in the starboard direction between the transmit and receive times over a time t (between the transmits or receives) for which t=0 is the time of receipt of the leading edge of the signal reflected off the ocean bottom. To translate this distance traveled by a ship into a corresponding time delay, xs(t) is multiplied by PHIs. PHIs is equal to Ks/c, where c is the speed of sound in water, and Ks is a constant corresponding to the angular placement off the MRA of the starboard pencil beam point.

The parameter Ts in the above equations represents the time differential converted to radians by multiplication with radians per second at the carrier rate between the arrival of an echoed wave front between adjacent hydrophones in the leg of the hydrophone array that is aligned athwart-ship (i.e. hydrophones 1-5 in FIG. 1). As can be gleaned from the above equations then, the reflected wave front is received at hydrophone 1 at "time" Ts later than the time that the wave front arrived at hydrophone 2. Similarly, the wave front is received at hydrophone 1 at "time" 2Ts later than the wave front was initially received at hydrophone 3. Equations CH1(t) through CH5(t) illustrate that the time period that hydrophones 2 through 5 receive the wave front are integer multiples of the time period Ts so that the simulation represents a hydrophone array where the hydrophones are equally spaced. To recapitulate, the term cosine ($2\pi f_c t$) simulates a wave form reflected off the ocean bottom, the term xs(t) represents the distance traveled by a ship between an initial time and a later time (multiplied by PHIs to change that distance to radians), and Ts represents the additional "time" (radians) it takes for a reflected plane wave to reach a hydrophone in a leg of the hydrophone array which is further down the leg from the initial hydrophone that received the reflected plane wave.

The preceding equations and description apply to a ship's movement towards starboard. That is, as a ship moves starboard, a reflected wave originating from the starboard side will wash over that array in a sequential fashion (for hydrophones that are aligned athwart-ship). With the transmission of two pulses, two of the hydrophones will produce a better correlation between the earlier and later pulses than any other hydrophone pair in that leg, thereby allowing the determination of how far a ship traveled between the transmits and receipt of the earlier and later pulses, and the determination of speed by dividing that distance by twice the time between the earlier and later pulses.

To simulate the movement of the ship in the forward direction, an additional sinusoidal term is added to each hydrophone equation to simulate the effects that a second forward oriented pencil beam will have on each hydrophone. As with the starboard oriented beam, the forward oriented beam may be oriented off the MRA (but in contrast to the starboard beam, in the forward direction). While the second pencil beam is introduced to simulate the movement of the ship in the forward direction (the parameters of which will be generated and discussed shortly), and the speed of that forward direction is calculated by examining which hydrophones in the two forward legs (5-9 and 13-16,1) produce the best correlation between the earlier and later pulses, the echoes of the forward oriented beams are also sensed by hydrophones 1-5 which, although they do not enter into the calculation of forward speed, still must be accounted for in equations CH1 (t) through CH5(t) if the simulation is to accurately reflect the conditions of an actual SONAR system. However, unlike the waves that originate from the starboard oriented beam, echoes of the forward oriented beams are received at the same time on hydrophones 1-5.

The contribution of the forward-oriented pencil beam to equations CH1(t) through CH5(t) changes those equations as follows:

$$CH1(t) = \cos(2\pi f_c t - PHIs \cdot xs(t)) + \cos(2\pi f_c t - PHIf \cdot xf(t))$$

$$CH2(t) = \cos(2\pi f_c t - PHIs \cdot xs(t)) - Ts) + \cos(2\pi f_c t - PHIf \cdot xf(t))$$

$$CH3(t) = \cos(2\pi f_c t - PHIs \cdot xs(t)) - 2Ts) + \cos(2\pi f_c t - PHIf \cdot xf(t))$$

$$CH4(t) = \cos(2\pi f_c t - PHIs \cdot xs(t)) - 3Ts) + \cos(2\pi f_c t - PHIf \cdot xf(t))$$

$$CH5(t) = \cos(2\pi f_c t - PHIs \cdot xs(t)) - 4Ts) + \cos(2\pi f_c t - PHIf \cdot xf(t))$$

In the above equations, xf(t) is the total distance traveled by a ship in the forward direction between the transmit and receive times over a time t (between the transmits or receives)

for which t=0 is the time of receipt of the leading edge of the reflected wave. This distance is translated into the appropriate time delay (expressed in radians) by multiplication with PHIf. PHIf is equal to Kf/c, where c equals the speed of sound in water, and Kf is a constant corresponding to the angular placement off the MRA of the pencil beam.

Now, to simulate the magnitude of a ship's speed in the forward direction, receipt of waves originating from a point lying forward of the hydrophone array by hydrophone legs aligned in the forward direction (hydrophones 5-9 and 13-16, 1 in FIG. 1) are simulated.

A wave that originates from a forward oriented beam on its return first encounters hydrophone 5, then hydrophone 6, and then hydrophones 7, 8 and 9. The time differential (converted to radians by multiplication with radians per second at the carrier rate) of an echoed wave front between adjacent hydrophones in a forward aligned leg of the hydrophone array (hydrophones 5-9) is represented by the parameter Tf.

Applying the principles used to generate simulation equations for channel 1 through channel 5, equations for the simulated received signals as a function of time on each of the 16 hydrophone channels of the hydrophone array of FIG. 1 are written as follows:

$$CH1(t)=\cos(2\pi f_{c1}t-PHIs*xs(t))+\cos(2\pi f_{c2}t-PHIf*xf(t))$$

$$CH2(t)=\cos(2\pi f_{c1}t-PHIs*xs(t))-Ts)+\cos(2\pi f_{c2}t-PHIf*xf(t))$$

$$CH3(t)=\cos(2\pi f_{c1}t-PHIs*xs(t))-2Ts)+\cos(2\pi f_{c2}t-PHIf*xf(t))$$

$$CH4(t)=\cos(2\pi f_{c1}t-PHIs*xs(t))-3Ts)+\cos(2\pi f_{c2}t-PHIf*xf(t))$$

$$CH5(t)=\cos(2\pi f_{c1}t-PHIs*xs(t))-4Ts)+\cos(2\pi f_{c2}t-PHIf*xf(t))$$

$$CH6(t)=\cos(2\pi f_{c1}t-PHIs*xs(t))-4Ts)+\cos(2\pi f_{c2}t-PHIf*xf(t))-Tf)$$

$$CH7(t)=\cos(2\pi f_{c1}t-PHIs*xs(t))-4Ts)+\cos(2\pi f_{c2}t-PHIf*xf(t))-2Tf)$$

$$CH8(t)=\cos(2\pi f_{c1}t-PHIs*xs(t))-4Ts)+\cos(2\pi f_{c2}t-PHIf*xf(t))-3Tf)$$

$$CH9(t)=\cos(2\pi f_{c1}t-PHIs*xs(t))-4Ts)+\cos(2\pi f_{c2}t-PHIf*xf(t))-4Tf)$$

$$CH10(t)=\cos(2\pi f_{c1}t-PHIs*xs(t))-3Ts)+\cos(2\pi f_{c2}t-PHIf*xf(t))-4Tf)$$

$$CH11(t)=\cos(2\pi f_{c1}t-PHIs*xs(t))-2Ts)+\cos(2\pi f_{c2}t-PHIf*xf(t))-4Tf)$$

$$CH12(t)=\cos(2\pi f_{c1}t-PHIs*xs(t))-Ts)+\cos(2\pi f_{c2}t-PHIf*xf(t))-4Tf)$$

$$CH13(t)=\cos(2\pi f_{c1}t-PHIs*xs(t))+\cos(2\pi f_{c2}t-PHIf*xf(t))-4Tf)$$

$$CH14(t)=\cos(2\pi f_{c1}t-PHIs*xs(t))+\cos(2\pi f_{c2}t-PHIf*xf(t))-3Tf)$$

$$CH15(t)=\cos(2\pi f_{c1}t-PHIs*xs(t))+\cos(2\pi f_{c2}t-PHIf*xf(t))-2Tf)$$

$$CH16(t)=\cos(2\pi f_{c1}t-PHIs*xs(t))+\cos(2\pi f_{c2}t-PHIf*xf(t))-Tf)$$

As previously explained, the first cosine term in the equations for hydrophones 1-5 simulates the return wave for a pencil beam originating from the starboard side of a vessel, and sequentially being sensed by the athwart-ship aligned hydrophones 1-5. The second cosine term in equations CH1(t) through CH5(t) represents the forward-oriented pencil beam that encounters hydrophones 1-5 at the same time (and therefore, there is no Tf term is the second cosine term for equations CH1(t) through CH5(t)). That is, for a simulated beam in the forward direction, there is no time differential for a hydrophone leg oriented in the athwart-ship direction.

In equations CH5(t) through CH9(t), the time differential that simulates the difference in the forward oriented echo pulse arriving first at channel 5, then at channel 6, and then channels 7, 8 and 9, is represented by parameter Tf and its increasing integer multiples. It is worthwhile to note at this point that the first cosine term in equations CH6(t)-CH9(t), that is the cosine term associated with a starboard wave, all have a 4Ts term subtracted from the cosine term because the starboard originating wave washes across these hydrophones at the same time it hits hydrophone 5, that is, 4Ts earlier in "time" than it encounters hydrophone 1.

For hydrophone channels 9-13, the equations are constructed using the same logic as was used in constructing equations for channels 1-5. That is, just as a return wave first hits channel 5, then hits channel 4, and then 3, 2, and 1, the same wave will also first encounter hydrophone channel 9, then channel 10, and then 11, 12 and 13. Consequently, channel 12 is differentiated from channel 13 by 1Ts, channel 11 from channel 13 by 2Ts, channel 10 from channel 13 by 3Ts, and channel 9 from channel 13 by 4Ts.

Likewise, for the remaining hydrophone channels 13-16, 1 on the second forward aligned leg of the hydrophone array, the forward oriented pencil beam is reflected and encounters channels 1, 16, 15, 14 and 13 in that order—represented in the simulation equations by the Tf terms. There are no Ts terms in this leg because like with equation CH1(t), the starboard originating wave first hits channels 5 through 9 at the same time, and then proceeds to wash across the athwart-ship legs of the array in a sequential fashion.

It should be noted that a slightly different frequency is used for the receive signals from the point source in one direction as compared to the other direction, i.e. $f_{c1}$ and $f_{c2}$. This is necessary to prevent mathematical cross correlation interference from affecting the overall channel correlation result. The two different frequencies address the fact that a different Doppler shift generally exists for the two different velocity components, and there is also a need to simulate the fact that the orthogonal pencil beams ensonify two independent locations on the ocean floor, so there should be a differing response signal, even if the velocity components are the same. These effects may be accommodated by refining the equations below with an additional term. The equations as shown below represent the fundamental procedure for this simulation invention.

If both the starboard and forward pencil beams lie off the MRA to the same degree, then Ts=Tf=T, which simplifies the equations somewhat as follows:

$$CH1(t)=\cos(2\pi f_{c1}t-PHIs*xs(t))+\cos(2\pi f_{c2}t-PHIf*xf(t))$$

$$CH2(t)=\cos(2\pi f_{c1}t-PHIs*xs(t))-T)+\cos(2\pi f_{c2}t-PHIf*xf(t))$$

$$CH3(t)=\cos(2\pi f_{c1}t-PHIs*xs(t))-2T)+\cos(2\pi f_{c2}t-PHIf*xf(t))$$

$$CH4(t)=\cos(2\pi f_{c1}t-PHIs*xs(t))-3T)+\cos(2\pi f_{c2}t-PHIf*xf(t))$$

$$CH5(t)=\cos(2\pi f_{c1}t-PHIs*xs(t))-4T)+\cos(2\pi f_{c2}t-PHIf*xf(t))$$

$$CH6(t)=\cos(2\pi f_{c1}t-PHIs*xs(t))-4T)+\cos(2\pi f_{c2}t-PHIf*xf(t))-T)$$

$$CH7(t)=\cos(2\pi f_{c1}t-PHIs*xs(t))-4T)+\cos(2\pi f_{c2}t-PHIf*xf(t))-2T)$$

$$CH8(t)=\cos(2\pi f_{c1}t-PHIs*xs(t))-4T)+\cos(2\pi f_{c2}t-PHIf*xf(t))-3T)$$

$$CH9(t)=\cos(2\pi f_{c1}t-PHIs*xs(t))-4T)+\cos(2\pi f_{c2}t-PHIf*xf(t))-4T)$$

$$CH10(t)=\cos(2\pi f_{c1}t-PHIs*xs(t))-3T)+\cos(2\pi f_{c2}t-PHIf*xf(t))-4T)$$

$$CH11(t)=\cos(2\pi f_{c1}t-PHIs*xs(t))-2T)+\cos(2\pi f_{c2}t-PHIf*xf(t))-4T)$$

$$CH12(t)=\cos(2\pi f_{c1}t-PHIs*xs(t))-T)+\cos(2\pi f_{c2}t-PHIf*xf(t))-4T)$$

$$CH13(t)=\cos(2\pi f_{c1}t-PHIs*xs(t))+\cos(2\pi f_{c2}t-PHIf*xf(t))-4T)$$

$$CH14(t)=\cos(2\pi f_{c1}t-PHIs*xs(t))+\cos(2\pi f_{c2}t-PHIf*xf(t))-3T)$$

$$CH15(t)=\cos(2\pi f_{c1}t-PHIs*xs(t))+\cos(2\pi f_{c2}t-PHIf*xf(t))-2T)$$

$$CH16(t)=\cos(2\pi f_{c1}t-PHIs*xs(t))+\cos(2\pi f_{c2}t-PHIf*xf(t))-T)$$

C. A SIMULATION EXAMPLE

The above equations may now be used to generate an analog signal that can be used as input into an actual NSS. An off the shelf wave generation product such as Labview® [National Instruments, 11500 N. Mopac Expressway, Austin Tex., 78759-3504] accepts equations as input, and generates the analog signals which are represented by these equations. An NSS can then accept as input the analog output of the wave generation product, and generate a velocity based on those waves just as if the NSS received actual bottom returns at sea. In this manner, the cost of testing an NSS at sea is obviated.

When preparing the equations for input into a signal generating system, values must be determined for the parameters in the equations. Depending upon one's needs regarding the testing of an NSS (e.g. higher velocities, reverse velocities, peak correlations on particular hydrophones, extreme starboard velocities compared to forward velocities, etc.), the values are chosen to mimic conditions and test velocities to suit those testing needs.

For example, one may want to test a situation where peak correlation occurs on two particular hydrophones. Peak correlation will occur between two hydrophones (both in the same hydrophone leg, e.g. hydrophone leg 1-5) if the receive signal for an earlier pulse on the first hydrophone at time 0 is identical in amplitude and phase to that of a later pulse on the other hydrophone at a later time called the correlation time ($T_c$). Given the above simulation equations, the relationship of the parameters PHI, xs(t), and T that are required to obtain the maximum correlation for a specified correlation time $T_c$ and a specified spacing between hydrophones in a chosen direction (forward or starboard) can be determined.

For example, assume that one would like to examine speeds in the starboard direction. Assume for this particular test that maximum correlation is sought for three hydrophone spacings, i.e. hydrophone 1 and hydrophone 4. Furthermore, for this particular test, it is assumed that velocity is constant so that xs(t)=t, i.e. the distance moved by the ship, represented by xs(t), is numerically equal to the time it took the ship to move that distance (e.g. 3 meters in 3 seconds).

For a plane wave originating from starboard, and assuming a correlation match over three hydrophone spacings is desired, one would simulate, for example, a correlation match between channel 1 and channel 4 for pulses received at times t=0 and t=Tc for the two channels, where Tc is the desired correlation time. The applicable equations are:

$$CH1(t)=\cos(2\pi f_{c1}t-PHIs*xs(t))$$

$$CH4(t)=\cos(2\pi f_{c1}t-PHIs*xs(t))-3T)$$

$$CH1(t)=\cos(2\pi f_{c1}0-PHIs*xs(0))$$

$$CH4(t)=\cos(2\pi f_{c1}Tc-PHIs*xs(Tc))-3T)$$

Since one knows the displacement between the hydrophones xs(0) vs. xs(Tc), one can assume an arbitrary value of T based on a reasonable angular location of the pencil beam, and the argument of the sinusoids above both must equal zero or a multiple of $2\pi$ radians. Therefore a value of PHIs can be computed and used in the simulation. Similarly a value for PHIf may be computed.

Correlation between the hydrophone channels in both the forward and starboard directions involves a product of two signals, each of which is a sum of two sinusoids:

$$z(t)=x(t)+y(t)$$

Where x(t) represents a signal in the starboard direction, and y(t) represents a signal in the forward direction. The correlation function of z(t) can then be expressed as:

$$Rz(CT)=E(x(t)*x(t+CT))+E(y(t)+y(t+CT))+E(x(t)+y(t+CT))+E(y(t)+x(t+CT))$$

Where E( ) is the expected value and CT is the correlation time. As one can see, the correlation function consists of two auto correlation terms and two cross correlation terms:

$$Rz(CT)=Rx(CT)+Ry(CT)+Rxy(CT)+Ryx(CT).$$

Because values of PHIs and PHIf were used to fix correlation peaks in the starboard and forward directions respectively, the auto correlation terms of Rx(CT) and Ry(CT) can be maximized. However, in order for the simulation to succeed, the cross correlation terms must be negligible. In other words x(t) and y(t) must be uncorrelated. Since x(t) and y(t) are sinusoids, it can be shown that the cross correlations are zero only if the carrier frequencies of x(t) and y(t) are not equal, which is why different frequencies are used for the simulated signals in the starboard oriented direction ($f_{c1}$) and the forward oriented direction ($f_{c2}$).

The simulated waveforms are phase-modulated signals and are thus a class of exponential or angular modulation. Considering a general modulated waveform:

$$x(t)=A\cos THET(t)$$

where $THET(t)=2\pi f_{c1}t-PHIs(t)$
where PHI(t) is the relative phase angle.
For a phase modulated waveform:

$$PHI(t)=Kd*f(t)$$

Where Kd is the phase deviation constant which is the maximum phase shift produced by f(t) where f(t) has a magnitude less than or equal to 1.
Therefore, for phase modulation:

$$x(t)=A\cos(2\pi f_{c1}t+Kd*f(t)).$$

The invention claimed is:

1. A process for testing a SONAR system via simulated acoustic waveforms, wherein the SONAR system comprises an array of hydrophones, and wherein the process comprises:
    generating a first correlation function that is representative of a first simulated reflected acoustic waveform and a second simulated reflected acoustic waveform, wherein the first correlation function enables correlation of a relatively earlier-in-time pulse received at a first hydrophone in the array to simulate any desired velocity;
    generating an analog signal based on the first correlation function;
    providing the analog signal to the SONAR system;
    generating an estimate of the desired velocity in the SONAR system based on the analog signal; and
    outputting the estimate of the desired velocity.

2. The process of claim 1 wherein the first correlation function is a sinusoidal expression that comprises:
    a first sinusoidal term for use in estimating velocity in a starboard direction; and
    a second sinusoidal term for use in estimating velocity in a forward direction.

3. The process of claim 2 wherein the first sinusoidal term is of the form $\cos(2\pi f_{c1} t - PHIs * xs(t))$, and wherein:
    (a) $\cos(2\pi f_{c1} t)$ simulates the first reflected acoustic waveform originating from a starboard side of the array;
    (b) $f_{c1}$ is a frequency of the simulated first acoustic waveform;
    (c) xs(t) represents a hypothetical distance traveled in the starboard direction over time t, wherein time t is the time between hypothetical transmit of the first acoustic waveform and hypothetical receive of the first acoustic waveform at a hydrophone in the array; and
    (d) PHIs equals $K_s/c$, wherein c is the speed of sound in water and Ks is a constant, and wherein PHIs converts the hypothetical distance traveled, xs(t), into a corresponding time delay.

4. The process of claim 2 wherein additional correlation functions are generated, wherein there is one correlation function for each hydrophone in the array, such that the total number of correlation functions, including the first correlation function, is equal to the number of active hydrophones in the array.

5. The process of claim 4 further comprising subtracting a time differential from the first sinusoidal term, wherein the time differential represents a difference in time between the first acoustic waveform contacting two different hydrophones in the array.

6. The process of claim 4 further comprising subtracting a time differential from the second sinusoidal term, wherein the time differential represents a difference in time between the second acoustic waveform contacting two different hydrophones in the array.

7. The process of claim 2 wherein the second sinusoidal term is of the firm $\cos(2\pi f_{c2} t - PHIf * x(t))$, and wherein:
    (e) $\cos(2\pi f_{c2} t)$ simulates a pencil-beam reflected acoustic waveform originating forward of the hydrophone array;
    (f) $f_{c2}$ is a frequency of the simulated acoustic waveform;
    (g) xs(t) represents a hypothetical distance traveled in the forward direction over time t, wherein time t is the time between hypothetical transmit of the acoustic waveform and hypothetical receive of the acoustic waveform at a hydrophone in the array; and
    (h) PHIf equals $K_f/c$, wherein c is the speed of sound in water and $K_f$ is a constant, and wherein PHIf converts the hypothetical distance traveled, xs(t), into a corresponding time delay.

8. A process for testing a SONAR system via simulated acoustic waves, wherein the SONAR system comprises a two-dimensional array of hydrophones having a number, i, of hydrophones in the array, the process comprising:
    generating a first correlation function that is representative of simulated reflected acoustic waves, wherein:
        (a) the first correlation function enables correlation of a relatively earlier-in-time pulse received at a first hydrophone in the array with a relatively later-in-time pulse received at a second hydrophone in the array to simulate any desired velocity of a vessel;
        (b) the first correlation function includes a first term that represents a first simulated acoustic waveform that is oriented in a first direction; and
        (c) the first correlation function includes a second term that represents a second simulated acoustic waveform that is oriented in a second' direction; and
    inputting said first correlation function into a waveform generation system, wherein said waveform generation system produces an analog signal based on the first correlation function;
    inputting the analog signal to the SONAR system;
    generating an estimate of the desired velocity of the vessel in the SONAR system based on the analog signal; and
    outputting the estimate of the desired velocity.

9. The process of claim 8 wherein the first correlation function is of the form:

$$CHx(t)_{x=1,i} = \cos(2\pi f_{c1} t - PHIs * xs(t)) + \cos 2\pi f_{c2} t - PHIf * xf(t)), \text{ wherein}$$

CHx(t) represents a hydrophone channel ;
$\cos(2\pi f_{c1} t - PHIs * xs(t))$ is the first term, which represents the first acoustic waveform received on hydrophone channel x ;
xs(t) represents a distance traveled by the vessel in the first direction during a time period between transmit and receive periods of a first pulse and a second pulse; and
PHIs is a constant K divided by the speed of sound in water;
$\cos 2\pi f_{c2} t - PHIPxf(t))$ is the second term, which represents the second acoustic waveform received on hydrophone channel x ; and
xf(t) represents a distance traveled by the vessel in the second direction during a time period between transmit and receive periods of a first pulse and a second pulse.

10. The process of claim 9 further comprising subtracting a time differential from the first term, wherein the time differential represents a difference in time between the first acoustic waveform contacting two different hydrophones in the array.

11. The process of claim 8 further comprising subtracting a time differential from the second term, wherein the time differential represents a difference in time between the second acoustic waveform contacting two different hydrophones in the array.

* * * * *